United States Patent
Sabin et al.

(10) Patent No.: US 8,967,628 B2
(45) Date of Patent: Mar. 3, 2015

(54) APPARATUS, SYSTEM AND METHOD FOR A LOAD-BEARING CART

(71) Applicants: Douglas G. Sabin, Marblehead, MA (US); Paul C. Sabin, Needham, MA (US); Joshua M. Gomes, Somerville, MA (US); Timothy F. Deso, Auburn, MA (US)

(72) Inventors: Douglas G. Sabin, Marblehead, MA (US); Paul C. Sabin, Needham, MA (US); Joshua M. Gomes, Somerville, MA (US); Timothy F. Deso, Auburn, MA (US)

( * ) Notice: Subject to any disclaimer, the term of this patent is extended or adjusted under 35 U.S.C. 154(b) by 0 days.

(21) Appl. No.: 13/719,353

(22) Filed: Dec. 19, 2012

(65) Prior Publication Data
US 2013/0154207 A1   Jun. 20, 2013

Related U.S. Application Data

(60) Provisional application No. 61/577,851, filed on Dec. 20, 2011.

(51) Int. Cl.
*B62B 5/02* (2006.01)
*A61G 5/06* (2006.01)
*B62B 1/10* (2006.01)

(52) U.S. Cl.
CPC ............... *B62B 5/026* (2013.01); *A61G 5/061* (2013.01); *B62B 5/023* (2013.01); *B62B 1/10* (2013.01); *A61G 5/068* (2013.01)
USPC ....................................................... 280/5.26

(58) Field of Classification Search
CPC ............ B62B 1/00; B62B 5/023; B62B 5/026
USPC ............. 180/5.2; 280/5.26, 5.32, 47.2, 47.12; 305/1
See application file for complete search history.

(56) References Cited

U.S. PATENT DOCUMENTS

| | | | |
|---|---|---|---|
| 1,334,726 A | 3/1920 | White | |
| 1,442,560 A | 1/1923 | Fahrkey | |
| 1,654,188 A * | 12/1927 | Phillips | 280/5.3 |
| 2,192,316 A | 3/1940 | Kellermann | |
| 2,243,915 A | 6/1941 | Mueller | |
| 2,459,275 A | 1/1949 | Gates | |
| 2,620,041 A | 12/1952 | Chen | |
| 2,653,672 A * | 9/1953 | Wessie | 180/8.2 |
| 2,706,640 A | 4/1955 | Marshall | |
| 2,733,074 A * | 1/1956 | Fuglie et al. | 280/5.2 |
| 2,740,484 A | 4/1956 | Montana | |
| 2,772,096 A | 11/1956 | Hanson | |
| 2,823,921 A | 2/1958 | Lagaard | |
| 2,856,015 A | 10/1958 | Stefan | |
| 2,933,323 A | 4/1960 | Webber | |
| 3,061,323 A | 10/1962 | Tittes | |
| 3,269,741 A | 8/1966 | Porcello | |

(Continued)

FOREIGN PATENT DOCUMENTS

DE    19614319 A1    10/1997

OTHER PUBLICATIONS

International Search Report and Written Opinion, dated Feb. 19, 2013, for counterpart International Application No. PCT/US2012/070465.

*Primary Examiner* — Joseph Rocca
*Assistant Examiner* — Felicia L Brittman
(74) *Attorney, Agent, or Firm* — Rhodes Donahoe, LLC

(57) ABSTRACT

A cart is configured to allow a user to gain mechanical advantage in moving a load up or down a step, a curb, a flight of stairs or other obstruction while at the same time allowing them to employ a conventional lifting motion in an improved ergonomic position.

16 Claims, 16 Drawing Sheets

(56) References Cited

U.S. PATENT DOCUMENTS

| | | |
|---|---|---|
| 3,330,370 A | 7/1967 | Morton |
| 3,346,269 A | 10/1967 | Soto |
| 3,362,496 A | 1/1968 | Landry |
| 3,494,440 A | 2/1970 | Hanson |
| 3,499,501 A | 3/1970 | Fitzgerald |
| 3,550,709 A | 12/1970 | Hottel |
| 3,724,864 A | 4/1973 | Balsbaugh et al. |
| 3,788,413 A | 1/1974 | Miller |
| 4,046,391 A | 9/1977 | Restad |
| 4,057,119 A | 11/1977 | Melson |
| 4,109,740 A | 8/1978 | Anduchiw |
| 4,142,732 A | 3/1979 | Boyd |
| 4,284,287 A | 8/1981 | Esposito |
| 4,566,551 A | 1/1986 | Feliz |
| 4,570,953 A | 2/1986 | McPeak |
| 4,639,004 A | 1/1987 | Maeda et al. |
| 4,790,548 A | 12/1988 | Decelles et al. |
| 5,042,827 A | 8/1991 | Mortenson |
| 5,141,240 A * | 8/1992 | Heilig ............ 280/5.3 |
| 5,263,547 A | 11/1993 | Alber |
| 5,277,436 A | 1/1994 | Frank et al. |
| 5,464,234 A * | 11/1995 | Ferguson ............ 280/5.32 |
| 5,833,249 A | 11/1998 | DeMartino |
| 6,164,398 A | 12/2000 | Alber |
| 6,386,552 B1 | 5/2002 | Bierma |
| 6,397,960 B2 * | 6/2002 | Alber ............ 180/8.2 |
| 6,402,161 B1 | 6/2002 | Baghdadi |
| 6,454,285 B1 | 9/2002 | Koenig |
| 6,752,400 B2 | 6/2004 | Nakatsukasa et al. |
| 6,935,447 B2 | 8/2005 | Bierma |
| 7,600,765 B2 | 10/2009 | Tsai |
| 2002/0104692 A1 | 8/2002 | Nakatsukasa et al. |
| 2003/0116927 A1 | 6/2003 | Quigg |
| 2004/0188960 A1 | 9/2004 | Bierma |
| 2005/0280220 A1 | 12/2005 | Shen |
| 2006/0037789 A1 | 2/2006 | Kritman et al. |
| 2006/0054367 A1 | 3/2006 | Stahler |
| 2006/0076739 A1 | 4/2006 | Kikusato |
| 2007/0075509 A1 | 4/2007 | Wyrick |
| 2008/0067762 A1 | 3/2008 | Reubos et al. |
| 2008/0164665 A1 | 7/2008 | Chang |
| 2008/0288128 A1 | 11/2008 | Gunderson |

* cited by examiner

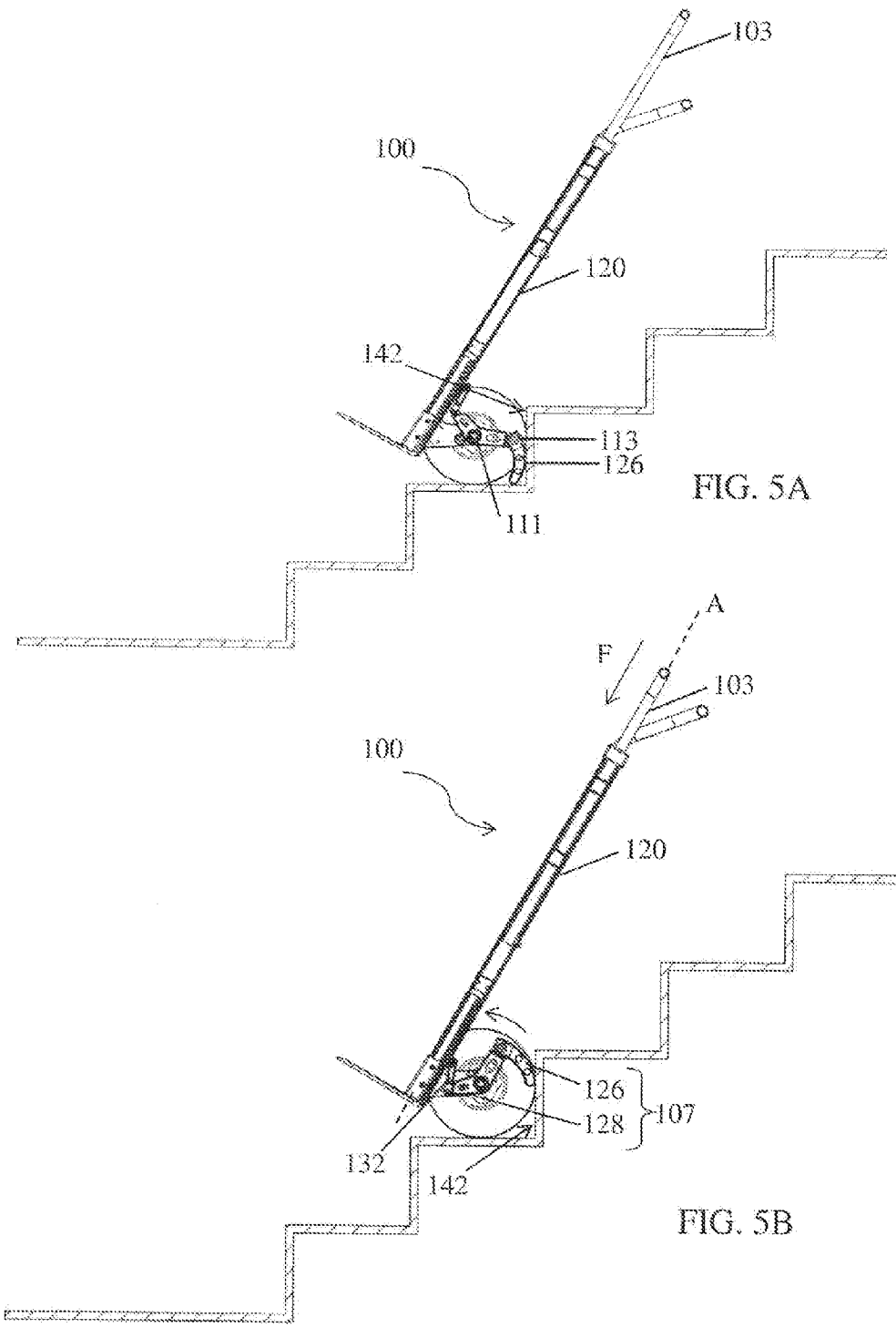

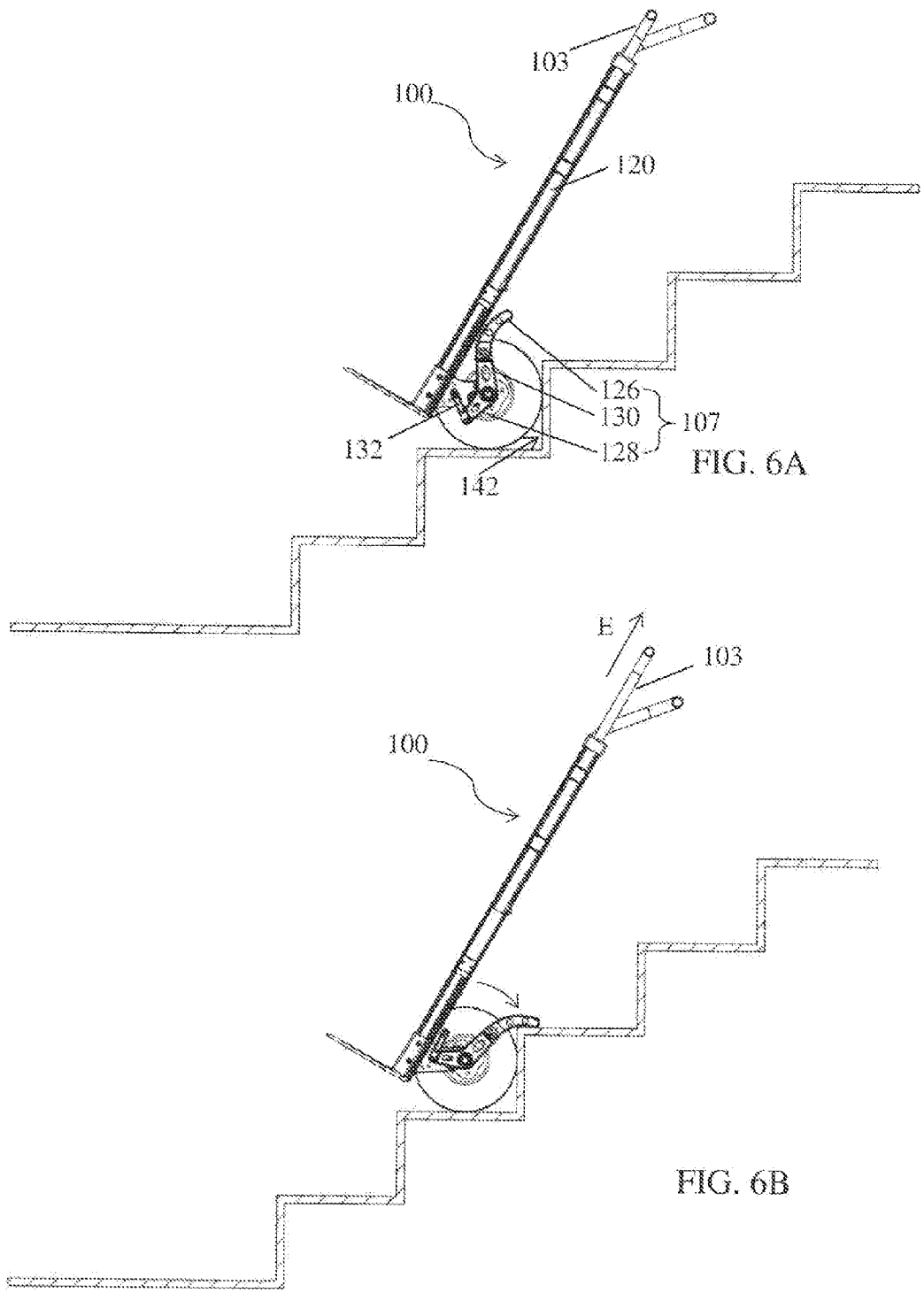

APPARATUS, SYSTEM AND METHOD FOR A LOAD-BEARING CART

RELATED APPLICATIONS

The application claims the benefit under 35 U.S.C. §119(e) to U.S. Provisional Application Ser. No. 61/577,851, entitled "HAND TRUCK APPARATUS," filed on Dec. 20, 2011, the disclosure of which is herein incorporated by reference in its entirety.

BACKGROUND OF INVENTION

1. Field of Invention

Embodiments of the invention generally relate to carts, more specifically, at least one embodiment relates to apparatus, systems and methods for a cart to move a load.

2. Discussion of Related Art

Hand trucks, also known as two wheelers, are extensively used in the delivery and warehouse environments. For example, hand trucks are used to move objects that are too heavy or to too large to easily carry. Hand trucks are also used to increase the number of products that can be delivered in a single trip by a delivery person to increase their efficiency for example, a beverage delivery company will provide hand trucks with each delivery vehicle. These hand trucks are often loaded with as much as 400 pounds of beverages in a single trip. Where a delivery is made to a facility on an upper or subgrade floor that does not have an elevator, the load must be moved up or down a flight of stairs by the delivery person. Currently the weight of such loads must be reduced in order to allow the delivery person to move the load over the stairs without injury. However, in the interest of doing their job as efficiently as possible, individual delivery people often over-exert themselves by trying to move too large a load up or down stairs with the conventional hand truck. As a result, back injuries represent a significant problem for delivery organizations and account for enormous cost in the form of lost work, workman's compensation and disability claims.

Conventional hand truck designs have tried to incorporate both powered and manual solutions to address the preceding. These attempts have included implementation of motor drives, lifting arms, moving belts and moving wheels, however, all lack the mechanical advantage and ergonomics required for ease of use. In some such conventional hand trucks, the operator must employ one hand to raise and stabilize the load and while their other hand is busy trying to operate the powered or manual solution which is added to the hand truck.

SUMMARY OF INVENTION

According to the various apparatus, system and methods described herein, a cart is configured to allow a user to gain mechanical advantage in moving a load up or down a step, a curb, a flight of stairs or over other obstructions while at the same time allowing them to employ a conventional lifting motion. For example, in some embodiments described herein, a cart includes a handle that is gripped with both hands by the operator to move the load while at the same time allowing the operator to use that same handle to operate a mechanical device that aids in moving the loaded cart up or down the step or over an obstruction.

According to one embodiment, the handle used to operate a lifting mechanism is configured to activate the lifting mechanism by moving the handle in a direction consistent with the direction by which an operator applies a lifting force to the cart. Thus, the operating handle of the lifting mechanism allows the operator to raise and stabilize the loaded cart using two hands on the operating handle while in an improved ergonomic position relative to what they otherwise would be in when moving a conventional cart. For example, the operator can raise and stabilize the load while standing in a more upright position. This reduces the possibility of a lower back injury.

In one aspect, a cart includes a frame, at least two wheels coupled to the frame and rotatable about a central longitudinal axis, an arm rotatable about the central longitudinal axis and extending radially therefrom, the arm including a distal end; and a handle coupled to the arm and configured to allow a user to grasp the handle to move the cart up stairs. According to some embodiments, the handle is configured to allow a substantially linear extension from the frame by the user to cause the arm to rotate about the central longitudinal axis to engage the distal end with the stairs as they are ascended.

According to another aspect, a method of moving a load supported by a cart from a first surface located at a first elevation to a second surface located at a second elevation is provided where the second elevation higher than the first elevation. In some embodiments, the cart includes a pair of wheels rotatable a central longitudinal axis, the cart further including a lever arm and a handle. In further embodiments, the method includes moving the cart on the first surface to engage the wheels with a substantially vertical surface that separates the first elevation from the second elevation; partially extending the handle from a home position in a substantially linear direction to rotate the lever arm about the central longitudinal axis and engage a distal end of the lever arm with the second surface; and further extending the handle in the substantially linear direction while moving the cart up the substantially vertical surface to place at least a portion of a weight of the load on the distal end of the lever arm.

According to another embodiment, a method of supporting at least a portion of a weight of a load which is being moved on a wheeled cart is provided. In further embodiments, the wheeled cart includes an axle having an axis, a first wheel and a second wheel located at opposite ends of the axle, respectively, an arm rotatable about the axis, and a handle. In still further embodiments, the method includes placing at least a portion of the cart in contact with a vertical face of a step; extending the handle in a linear direction; rotating the arm about the axis in a first direction to engage the arm with a horizontal face of the step in response to the extension of the handle; and ascending the step with the cart using the handle to place the at least a portion of the weight on the arm. In a further embodiment, the method includes supporting the at least a portion of the weight on the arm while descending a step. In one embodiment, the act of placing includes an act of engaging the first wheel and the second wheel with the vertical face of a step.

In a further aspect, a cart includes a frame, at least two wheels coupled to the frame and rotatable about a central longitudinal axis, an arm rotatable about the central longitudinal axis and extending radially therefrom, the arm including a distal end; and a handle coupled to the arm and configured to allow a user to grasp the handle to move the cart over obstacles. According to some embodiments, the handle is configured to allow a substantially linear extension from the frame by the user to cause the arm to rotate about the central longitudinal axis to engage the distal end with the obstacle to bear at least a portion of the load supported by the cart as the cart is moved over the obstacle.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 5A and 5B illustrate the cart being moved into engagement with a subsequent step in accordance with one embodiment;

FIGS. 6A and 6B illustrate a start of a lifting process up the subsequent step in accordance with one embodiment;

DETAILED DESCRIPTION

Figure 1:
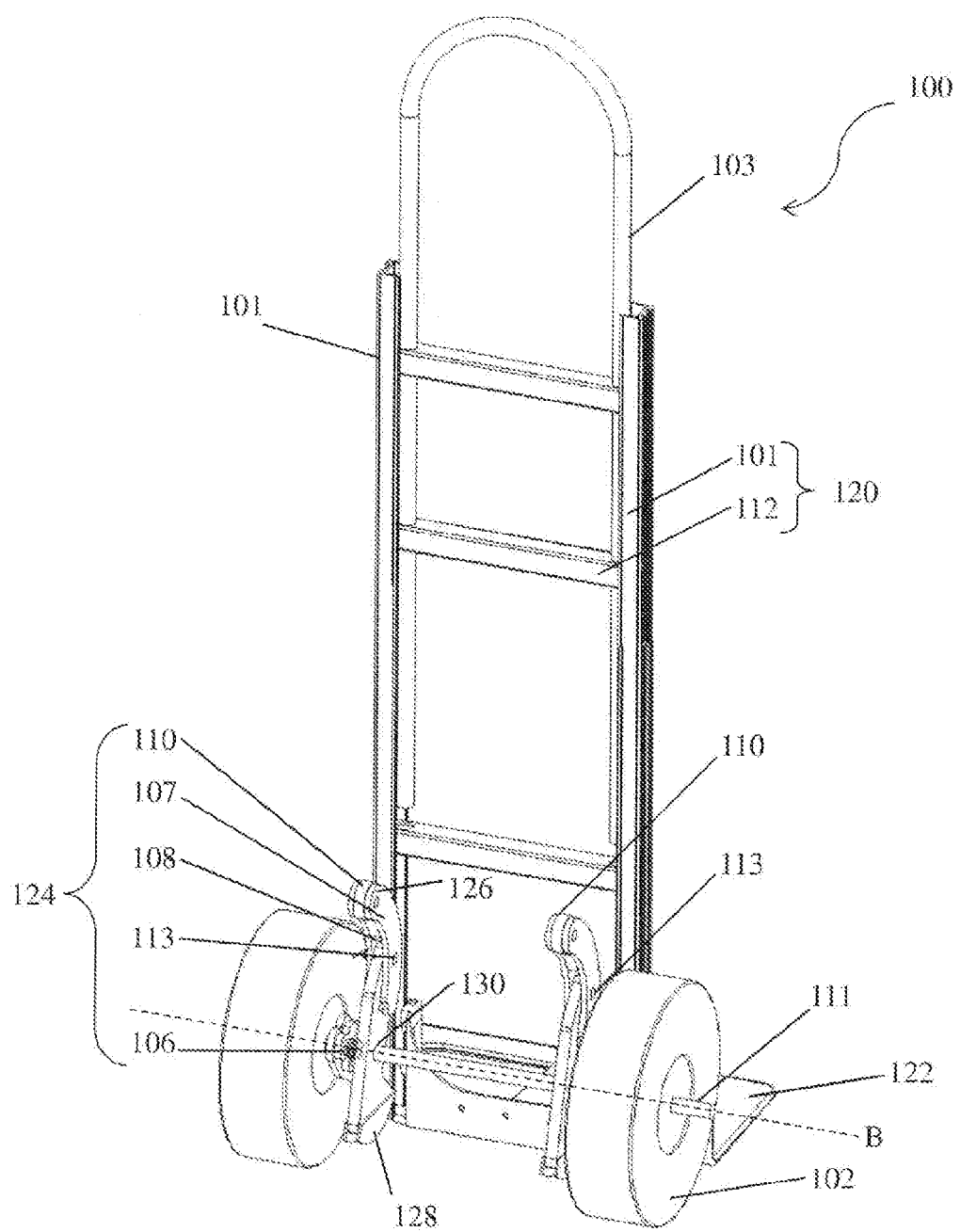
FIG. 1 illustrates a cart in accordance with one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

FIG. 1 illustrates a cart in accordance with one embodiment. As used herein, the term "cart" refers to any wheeled cart such as hand trucks, two wheelers or other carts that are load-bearing because they are employed to move loads manually using the strength of an operator to guide and move them up, down and/or over obstacles. In FIG. 1, the cart 100 includes a frame 120 that can include at least two side rails 101 and one or more cross members 112. Further the cart 100 can include a handle 103. In accordance with some embodiments, the handle 103 is included as an integral part of the frame 120 while in other embodiments the handle 103 is a separate element attached to the frame in some manner. Further, depending upon the embodiment, the cart 100 can include a single handle or a plurality of handles. In the illustrated embodiment, the cart 100 includes a tray 122, an axle 111 and wheels 102 connected to opposite ends of the axle 111. In one embodiment, the tray 122 is formed as an integral part of the frame 120. In another embodiment, the tray 122 is secured to the frame 120, for example, welded or bolted thereto.

In the illustrated embodiment, the cart 100 includes a telescoping handle 103 where the handle slidingly engages the frame 120 to operate a lifting mechanism 124. In the illustrated embodiment, the lifting mechanism includes an arm 107, a spring 108, a pivot pin 113, a spring 106, and a roller 110 located at a distal end of the arm 107. According to some embodiments, the spring 106 is either not included in the lifting mechanism 124 or it is included as part of the axle 111. Further, in some embodiments, the handle 103 is included as a part of the lifting mechanism 124.

Figure 7:
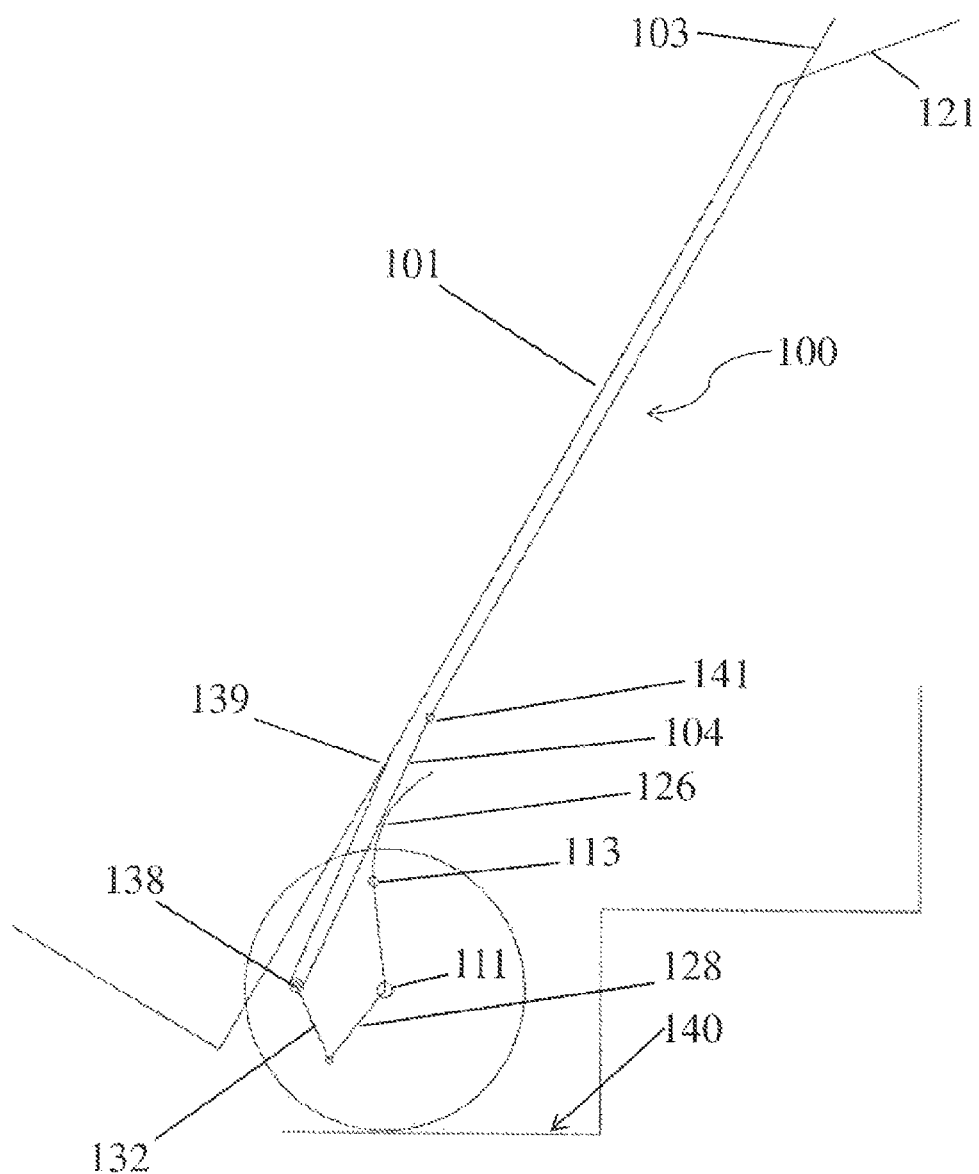
FIG. 7 is a schematic diagram of the cart approaching a step in accordance with one embodiment.

The lifting mechanism 124 can also include a cable 104 (see FIG. 7, for example). Further, in the illustrated embodiment, the arm 107 is attached to the cable 104, and the arm includes the spring 108 (for example, located within the arm 107), and the pivot pin 113. In the illustrated embodiment, the spring 106 is located at the axle and attached to the arm 107. In various embodiments, the cart 100 can include a single arm 107 or a plurality of arms including at least two or more arms 107.

In accordance with one embodiment, the arm 107 includes a distal end 126, a proximate end 128 and a body 130. In the illustrated embodiment, the body 130 is attached to the axle 111 about which the wheels 102 rotate. Further, the body 130 in combination with the proximate end 128 provides a nautilus shape for a further mechanical advantage when the lifting mechanism 124 is in use. According to another embodiment, only the body 130 of the arm 107 provides the nautilus shape. The nautilus can be used to increase the mechanical advantage as a radius of the nautilus is increased. With this approach, the increased radius of the nautilus decreases the force required by the operator to move the cart up a step, but also increases the travel stroke of the lifting mechanism, for example, as measured by the travel of the handle 103 to operate the lifting mechanism. In still further embodiments, a nautilus shape is not employed. Regardless of whether the arm 107 includes a nautilus, design of the arm (for example, the maximum diameter of the arm) should be such that the arm 107 does not interfere with rotation of the wheels 102 about the axle 111. For example, in embodiments where a nautilus is used, the nautilus diameter and a radius of the arm 107 (for example, where the arm is in a folded or collapsed state) are smaller than a diameter of the wheels 102.

In some embodiments, the distal end 126 of the arm 107 is attached to the body 130 at the pivot point 113. In various embodiments, the pivot point 113 can be implemented using a pin, axle and/or bearings or other known configurations that will allow a rotational movement about the axis of the pivot point 113. Embodiments that include a pivot point can allow the arm 107 to collapse (or fold) as described herein. Such an approach can also allow the length of the arm 107 to be increased for increased mechanical advantage when lifting a loaded cart up stairs while not interfering with the rolling operation of the cart 100. Further, the collapsible arm 107 allows the fully extended arm to be used while climbing a step to maximize the mechanical advantage while also allowing the wheels of the cart to be rolled into engagement with the next step to be climbed without interference by the arm 107.

In general, the cart 100 is operated by placing a load to be moved on the tray 122 whereby the user grasps the handle 103 to roll the cart and its load around. In various embodiments, however, the handle is multipurpose because is also allows the user to activate a lifting mechanism to assist in moving the loaded cart over obstacles, for example, either ascending or descending a step or a flight of stairs. As described below, embodiments of the invention can substantially reduce the load experienced by a user as they ascend (lifting load) a step or flight of stairs.

The following generally describes a lifting operation provided for by embodiments of the cart 100. With the wheels 102 engaged with a step that is to be ascended, the operator begins to extend the handle 103 from the frame 120 to pull the cable 104 upward and rotate the distal end 110 of the arm 107 into engagement with the step. A further extension of the handle 103 (which can be achieved by extending the handle 103 further from the frame 120) provides a force that engages the distal end 126 in a lifting load-bearing motion against the step as the user pulls upward on the handle 103. The wheels 102 of the cart engage the vertical face of the step in a conventional fashion, however, the arm bears and lifts a considerable portion of the load carried by the cart 100 as the cart is drawn up the vertical face. The operator can continue to roll the cart onto the horizontal surface of the stair that was just ascended into engagement with the subsequent stair, where one exists.

According to the illustrated embodiment, the axle is a location of the axis of rotation of both the arm 107 and the wheels 102. The foldable nature of the distal end of the arm 107 allows the distal end 126 to collapse inward towards the axle 111. The user can depress the handle (that is, slide the handle 103 in a direction of the frame 120) to rotate the arm 107 about the axle 111 such that the distal end 126 of the arm is pulled toward the frame in a direction of a home position. When the distal end of the arm clears the vertical face of the step that the cart is currently engaged with, the arm 107 will return to the fully extended position. With the handle 103 fully returned to a home position of the handle 103, the arm 107 is rotated into a position where the fully extended arm is located adjacent the frame 120 that is, the home position of the arm. The cart 100 is now ready to climb a subsequent step or steps in a flight of stairs using the same approach with the lifting mechanism reset and available to give the user a mechanical advantage for each step that is climbed.

Figure 2A:
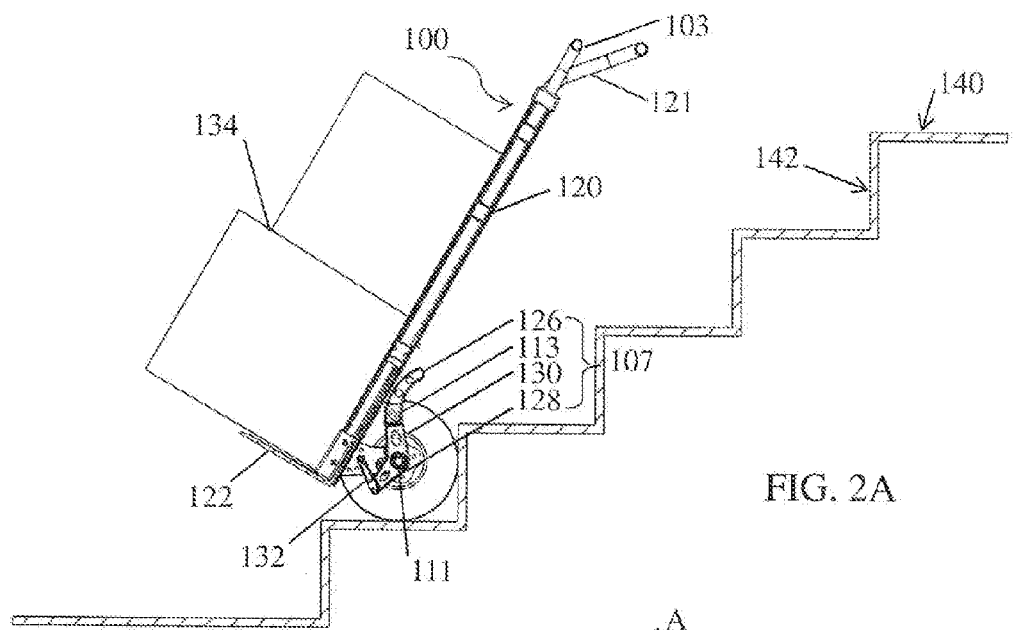
FIGS. 2A and 2B illustrate a cart engaging a step in accordance with one embodiment.
Figure 2B:
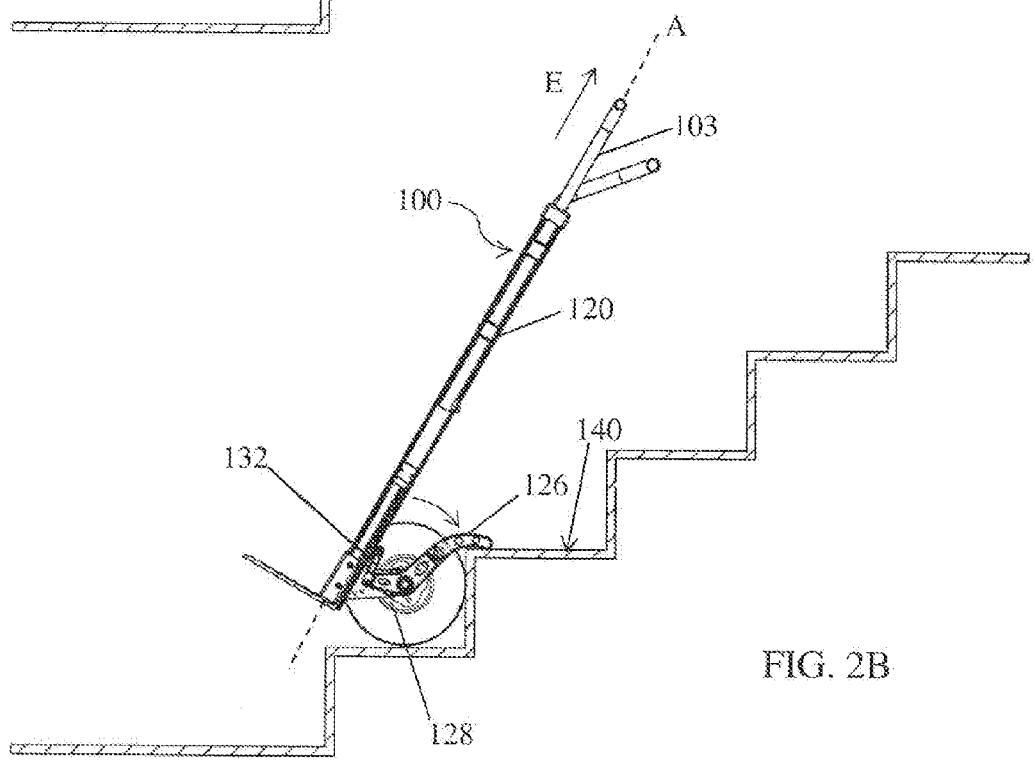

Operation of the cart 100 will now be described with reference to FIGS. 2A-6B in accordance with one embodiment. FIG. 2A illustrates a cart 100 with a load 134 being moved up a flight of stairs. The load 134 is illustrated in FIG. 2A, for clarity, the load is not depicted in FIGS. 2B-6B. However, the operation illustrated in FIGS. 2B-6B is performed for purposes of this description with the load 134. In various embodiments, the cart 101 can also be moved up and down stairs without a load in the manner illustrated in FIGS. 2A-6B however the need for mechanical lifting assistance is generally not required in such circumstance. Also in FIGS. 2A-6B each step in the flight of stairs includes a horizontal surface 140 and a vertical surface (or face) 142. Further, FIG. 2B illustrates a longitudinal axis A of the frame. As will be recognized by those of skill in the art, reference to the surfaces 140, 142 and Axis A apply to all FIGS. 2A-6B. Further, the central longitudinal axis of the axle 111, the axis B illustrated in FIG. 1, is located in FIGS. 2A-6B in a direction normal to the illustration at the center of the axle 111. FIG. 2A also illustrates a link 132 included in the lifting mechanism 124. The attachment of the cable 104 from the link 132 to the handle 103 is not illustrated in FIGS. 2A-6B, however it is illustrated and described with reference to FIGS. 7-14. In summary, the link 132 is raised and lowered as the handle 103 is extended from and returned to the frame 120, respectively.

According to one embodiment, the travel of the handle 103 between the home position and the fully extended position is accomplished with a sliding and/or linear motion.

Referring now to FIG. 2A, the cart 100 is located on the horizontal surface 140 of a first step and in engagement with a vertical surface 142 of a second step. As illustrated in FIG. 2A, the handle 103 is located in the home position. The bias of the spring 106 acts to rotate the body 130 to its home position. In addition, the spring 108 acts to fully extend the distal end 126 of the arm 107 from the body 130. As a result, the arm 107 is located in its home position whereby the distal end 126 is adjacent the frame 100.

Referring now to FIG. 2B, the handle 103 is extended to pull the link 132 upward. This action rotates the arm 107 in a clockwise direction where the proximate end rotates upward and the distal end 126 rotates downward into engagement with the surface 140 (the top of the step). In the illustrated embodiment, the handle 103 is constructed to slide within the frame 120 such that, as illustrated, the linear movement of the handle 103 occurs along the axis A of the cart 100. In accordance with other embodiments, the handle 103 is not aligned with the longitudinal axis A of the cart 100, but is instead, extended linearly in a direction parallel to the axis A. As some examples, the handle 103 can be located parallel to and above the frame, parallel to and below the frame, coaxial and internal to the frame or coaxial and external the frame.

Figure 3A:
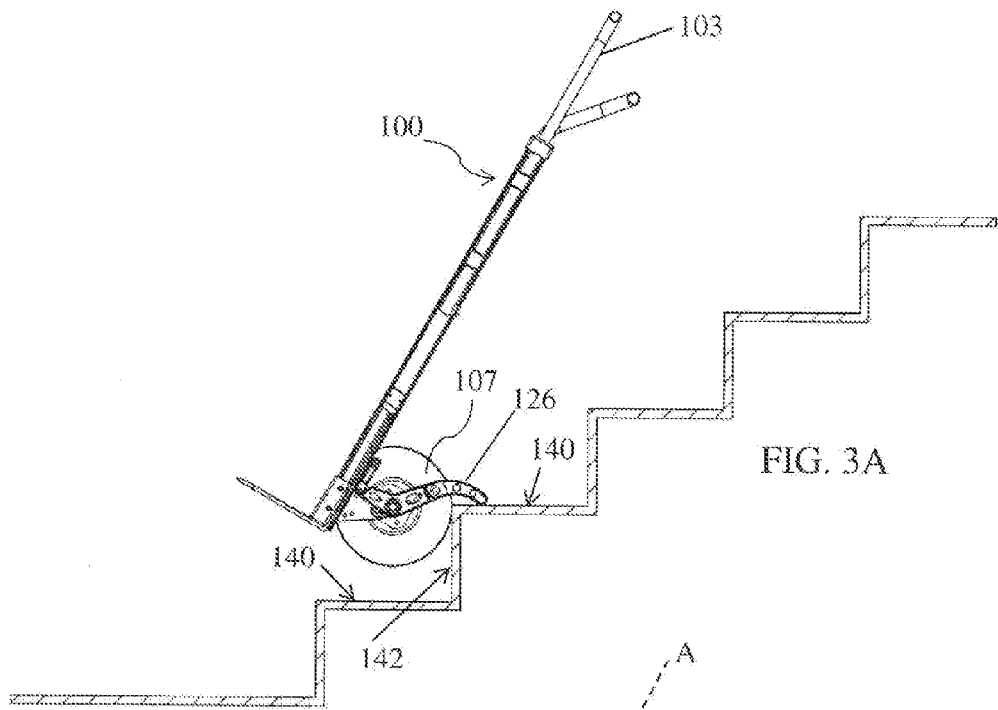
FIGS. 3A and 3B illustrate the cart being moved up a face of a step.
Figure 3B:
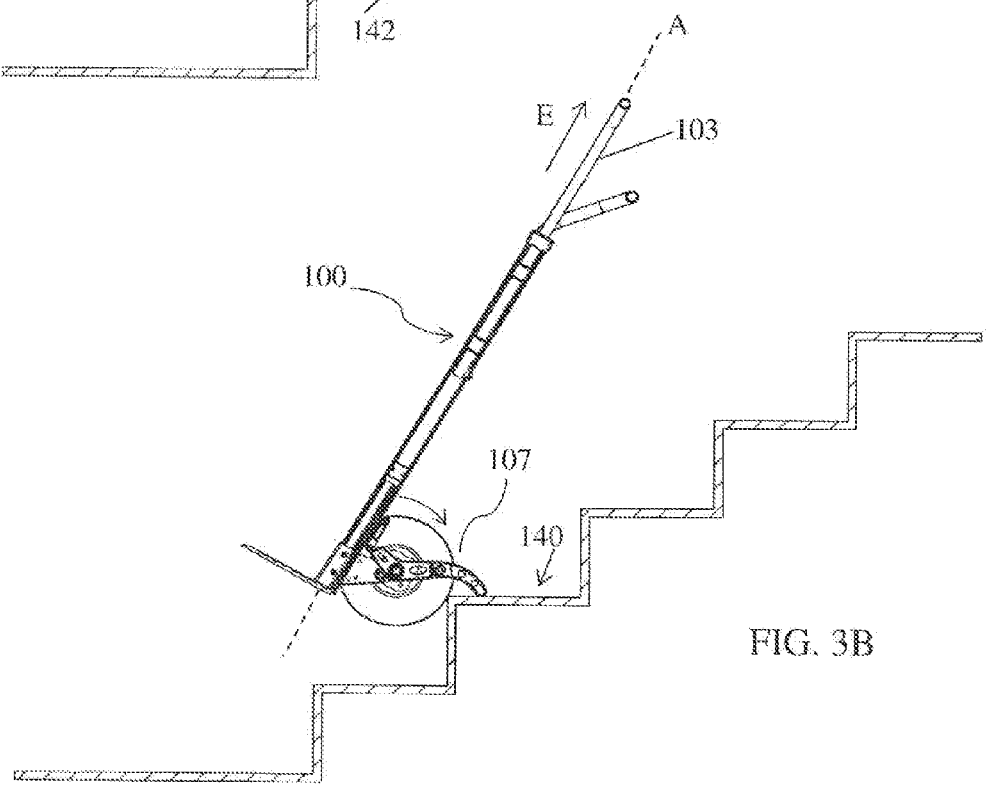

Referring now to FIG. 3A, the distal end 126 of the arm 107 engaged with the surface 140 as is moved up the surface 142. The movement of the cart 100 occurs with a reduced load because the arm 107 provides a moment about which the operator can pivot the cart up and onto the surface 140. The extension of the handle 103 also increases a length of a lever arm employed by the operator which increases the leverage available to the operator when they tilt and raise the cart 100 up onto the surface 140. In FIG. 3B, it is further shown how a continued extension of the handle 103 increases the mechanical advantage provided to the operator as the cart 100 is raised onto the surface 140. For example, as illustrated in FIG. 3B, the extension further rotates the arm 107 in a clockwise direction and provides the operator with a further extended arm on which to raise the cart 100 up onto the surface 140. In the illustrated embodiment, the continued linear extension of the handle 103 allows the user to ergonomically move the cart up the stairs with the reduced load. In particular, the linear extension allows the user to reduce the pressure placed on the lower back because they can stand upright when moving the cart up the stairs.

The improved ergonomics result, in part, from the telescoping nature of the handle that allows the operator to move up the stairs above the step that is being ascended while operating the lifting mechanism 124 with the same handle 103 with which the cart is moved. According to some embodiments, the reduction in force required to raise a loaded cart using the lifting mechanism 124 is approximately 50% relative to the force required to raise the loaded cart without the use of the lifting mechanism.

Figure 4A:
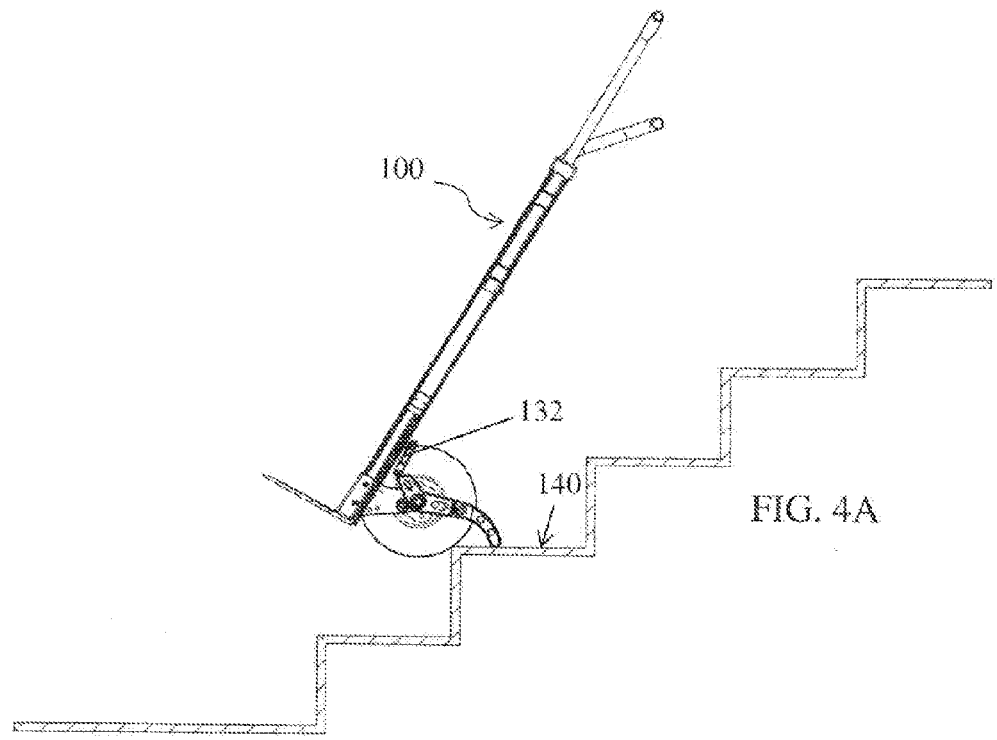
FIGS. 4A and 4B illustrate the cart moving over the upper end of the face of the step in accordance with one embodiment.
Figure 4B:
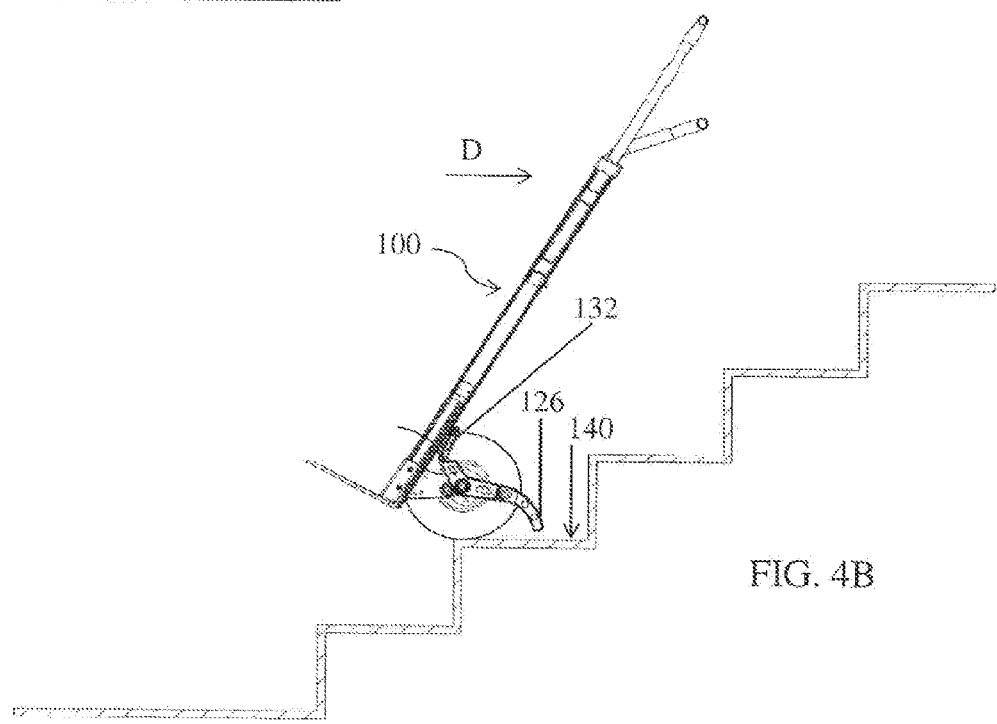

Referring now to FIGS. 4A and 4B, the wheels of the cart 100 are raised onto the surface 140 and begin to roll along the surface. FIG. 4A illustrates the wheels as they just raise onto the surface 140. FIG. 4B illustrates the cart 100 with the handle 103 fully extended. In this position, the distal end 126 of the arm 107 is no longer engaged with the surface 140 as the wheels move up and over the top of the step. In various embodiments, the cart includes a stop to prevent the arm 107 from rotating too far and remaining in engagement with the step. According to one embodiment, the stop is included in the lifting mechanism 124 while in another embodiment the stop is included in the handle 103. As illustrated in FIG. 4A, the cart 100 can freely roll along the surface in the direction of the arrow D. In addition, FIGS. 4A and 4B illustrate the link 132 pulled upward along the frame 120 such that it reaches its highest vertical position that occurs during operation.

Referring now to FIG. 5A, the cart is rolled along a surface 140 such that the wheel and the distal end 126 of the arm 107 engage the vertical surface 142 of the next step. With the handle extended, the distal end 126 can fold (or collapse) back toward the central axis of the axle 111 and the proximate end 128 of the arm 107. As illustrated in FIG. 5A, the pivot point 113 is the point about which the distal end 126 rotates. In FIG. 5B, the handle is partially returned to the home position in the reverse direction F. In some embodiments, movement of the handle 103 is by a linear sliding motion. In some embodiments, the sliding motion acts to move the handle along the axis A of the frame. A sliding motion in the direction F allows the bias of the spring 106 to rotate the body 130 (and the remainder of the arm 107) in a counterclockwise direction about the axle 111. As a result, the link 132 moves and the proximate end 128 of the arm 107 move downward while the distal end 126 moves back toward the frame 120. Here, the roller 110 allows the distal end 126 to easily slide along the vertical face 142 of the subsequent step. However, some embodiments may not include the roller 110.

FIG. 6A illustrates the cart 100 with the handle 103 returned to home position. It will be apparent to those of skill in the art that in the illustrated embodiment, the rotation of the arm 107 is about the central longitudinal axis of the axle 111 which is the same axis about which the wheels 102 rotate. According to other embodiments, the arm 107 rotates about an axis that differs from the axis around which the wheels rotate, for example, the arm can pivot about an axis perpendicular to the frame 120. With the handle 103 returned to the home position, the link 132 moves downward and the arm 107 moves counter-clockwise such that the distal end 126 clears the vertical face 142 of the subsequent step (the next step to be climbed). With the distal end clear of the face 142 the spring 108 acts to rotate the distal end such that it is fully extended from the body 130. This returns the distal end 126 to the home position adjacent the frame 120. The cart 100 is now ready to climb a subsequent step in the flight of stairs. According to some embodiments, the complete return of the handle 103 to the home position is not required and a smaller range of motion can be employed to ascend the steps. According to these embodiments, a larger operator may find it easier to limit the return travel of the handle 103. FIG. 6B illustrates the start of the climbing or ascending of the next step with the handle 103 partially extended in the direction E.

FIGS. 7-14 provide schematic diagrams of an operation of the cart in accordance with one embodiment for added clarity. The illustrated embodiment includes the handle 103 and a second handle 121 that is included as part of the frame 101. The cart also includes a pulley 138 located at a distal end of the link 132. In some embodiments, the pulley is included in the lifting mechanism 124. In the illustrated embodiment, the cable 104 operates around the pulley 138. According to one embodiment, the cable 104 has a fixed length and is attached to the frame 120 at a first attachment point 139 and to the handle 103 at a second attachment point 141.

Because the linear travel of the handle 103 is related to the pulley ratio, in some embodiments, the pulley 138 is selected to provide a lifting mechanism having a desired combination of mechanical advantage and ergonomic utility. Here, one ergonomic consideration is that the handle extension (or travel) be limited to a maximum length because too long an extension becomes unwieldy for an operator on a stairway. In some embodiments, the pulley 138 is a 2:1 pulley that acts to multiply the force from the extension of the handle by two (for example, neglecting friction) or approximately two. In one embodiment, the arm includes a nautilus shape having a diameter of approximately 7 inches. According to this embodiment, a 13 inch linear travel of the handle 103 combined with the 7" nautilus reduces the lifting load by more than 45%. In another embodiment, the lifting mechanism reduces the peak load by 42%.

Figure 8:
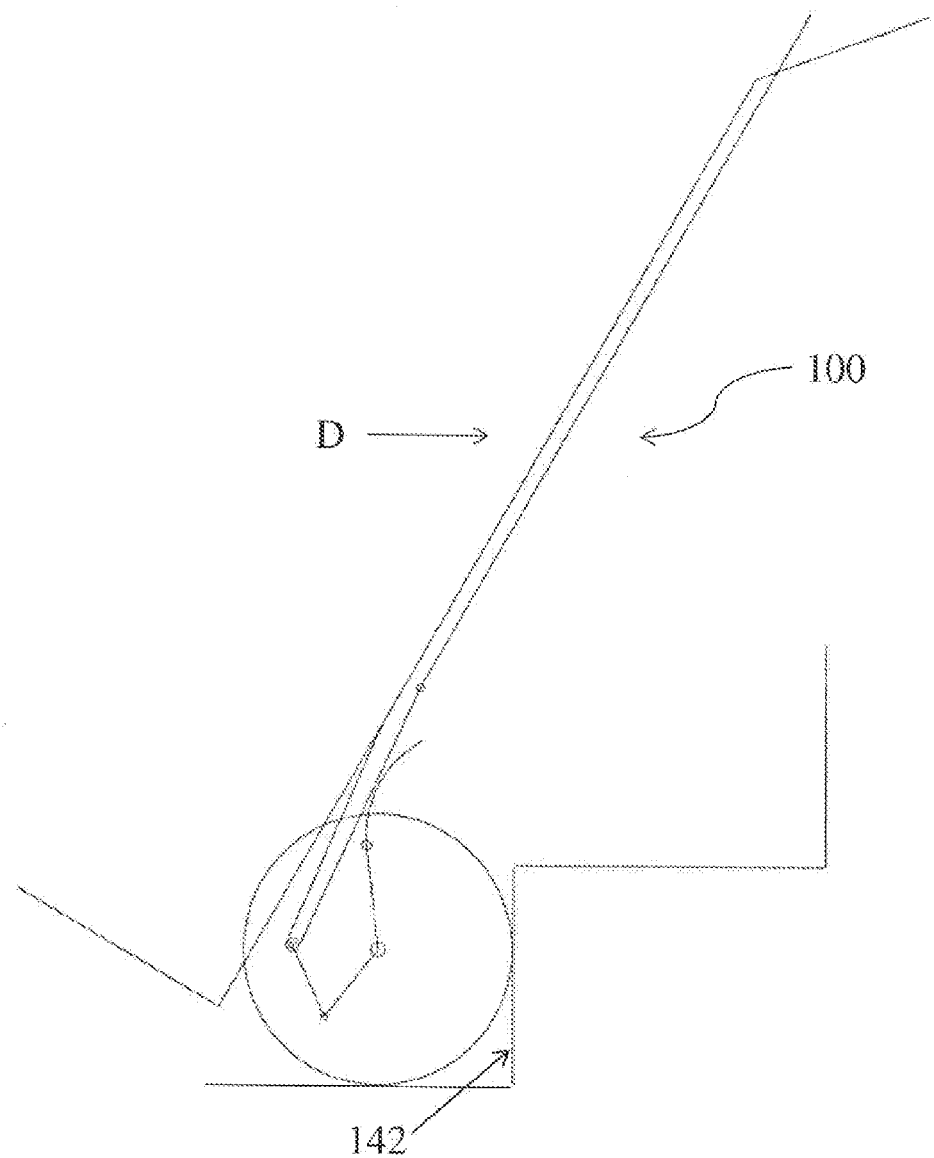
FIG. 8 is a schematic diagram of the cart engaged with the step in accordance with one embodiment.
Figure 9:
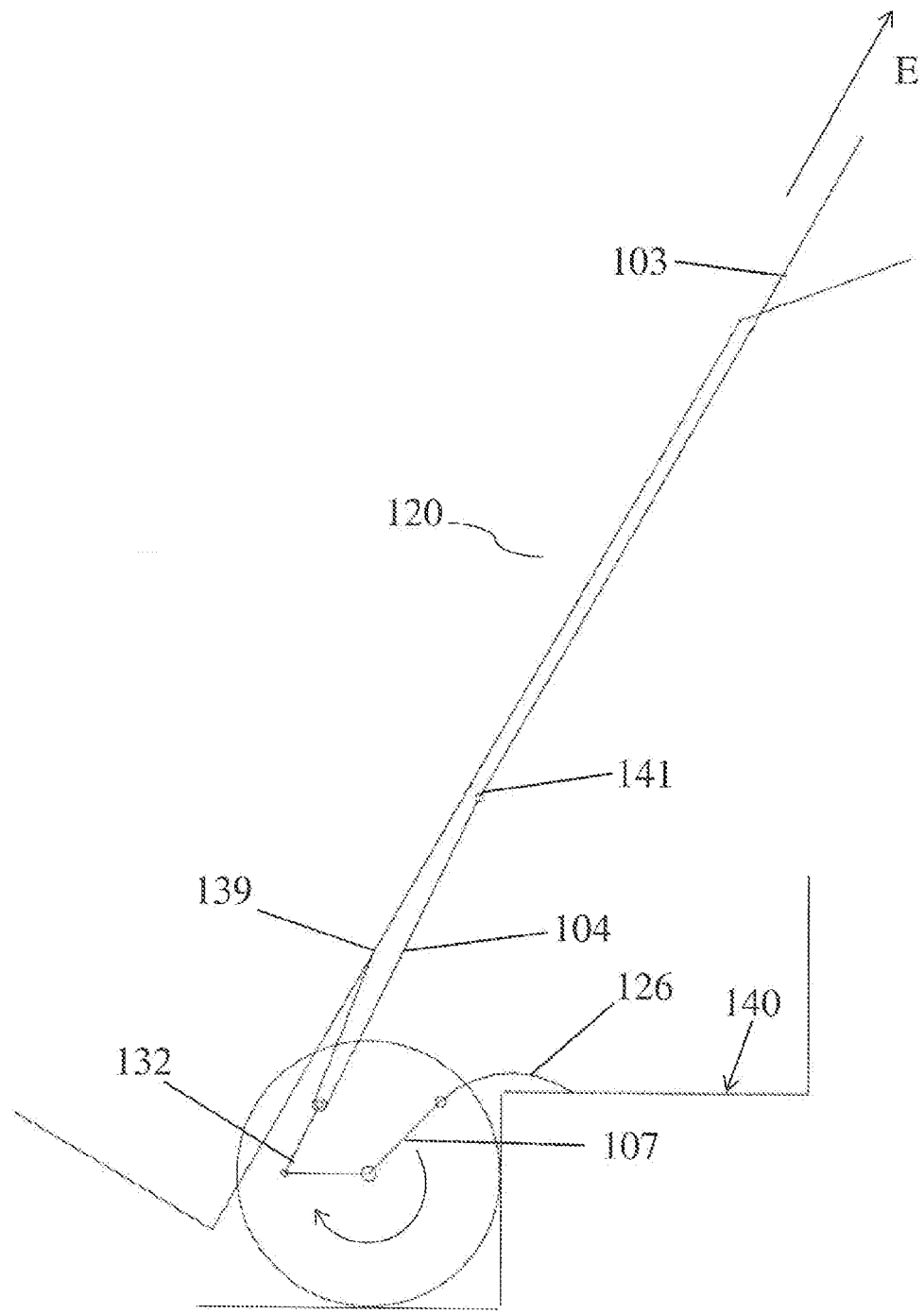
FIG. 9 is a schematic of the cart with an arm engaging a step to be climbed in accordance with one embodiment.

FIG. 7 illustrates the cart 100 with the handle 103 in the home position and the wheels 102 located on a first horizontal surface 140. FIG. 8 illustrates the cart 100 moved in the direction of the vertical face 142 of the step that is to be climbed. In FIG. 9, the handle 103 has been moved linearly in the direction E which linearly extends the handle from the frame 120. As described with other embodiments, extension of the handle 103 moves the distal end of the link 132 upward. In the illustrated embodiment, the cable 104 operates on the pulley with the second attachment point 140 moving upward with the handle. Because the first end of the cable 104 is attached to the frame at 139, the link 132 moves upward along the frame. This action rotates the arm 107 from its home position and into engagement with the horizontal surface 140 of the step that is being climbed.

Figure 10:
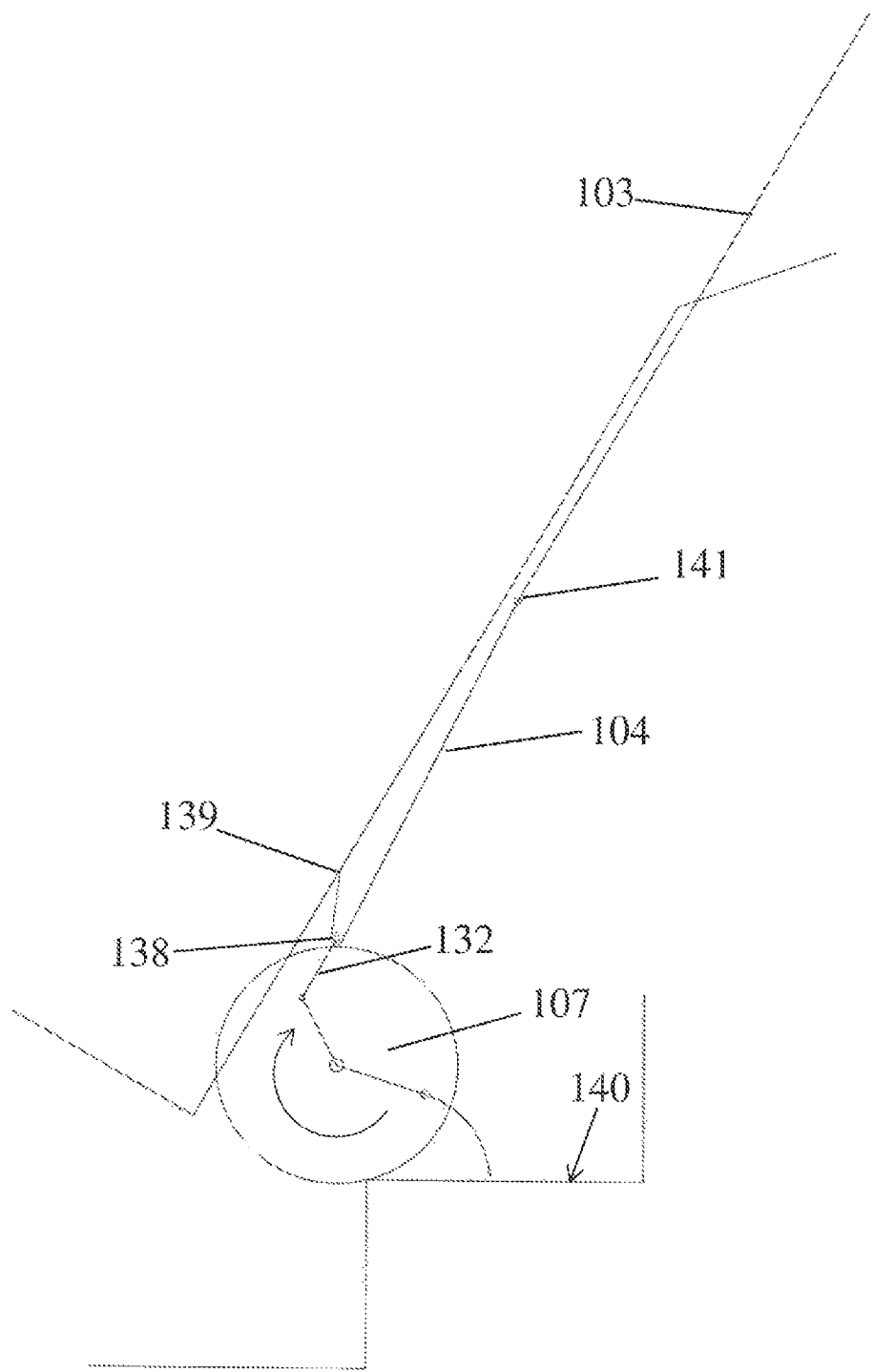
FIG. 10 illustrates the step being ascended with assistance of the arm in accordance with one embodiment.
Figure 11:
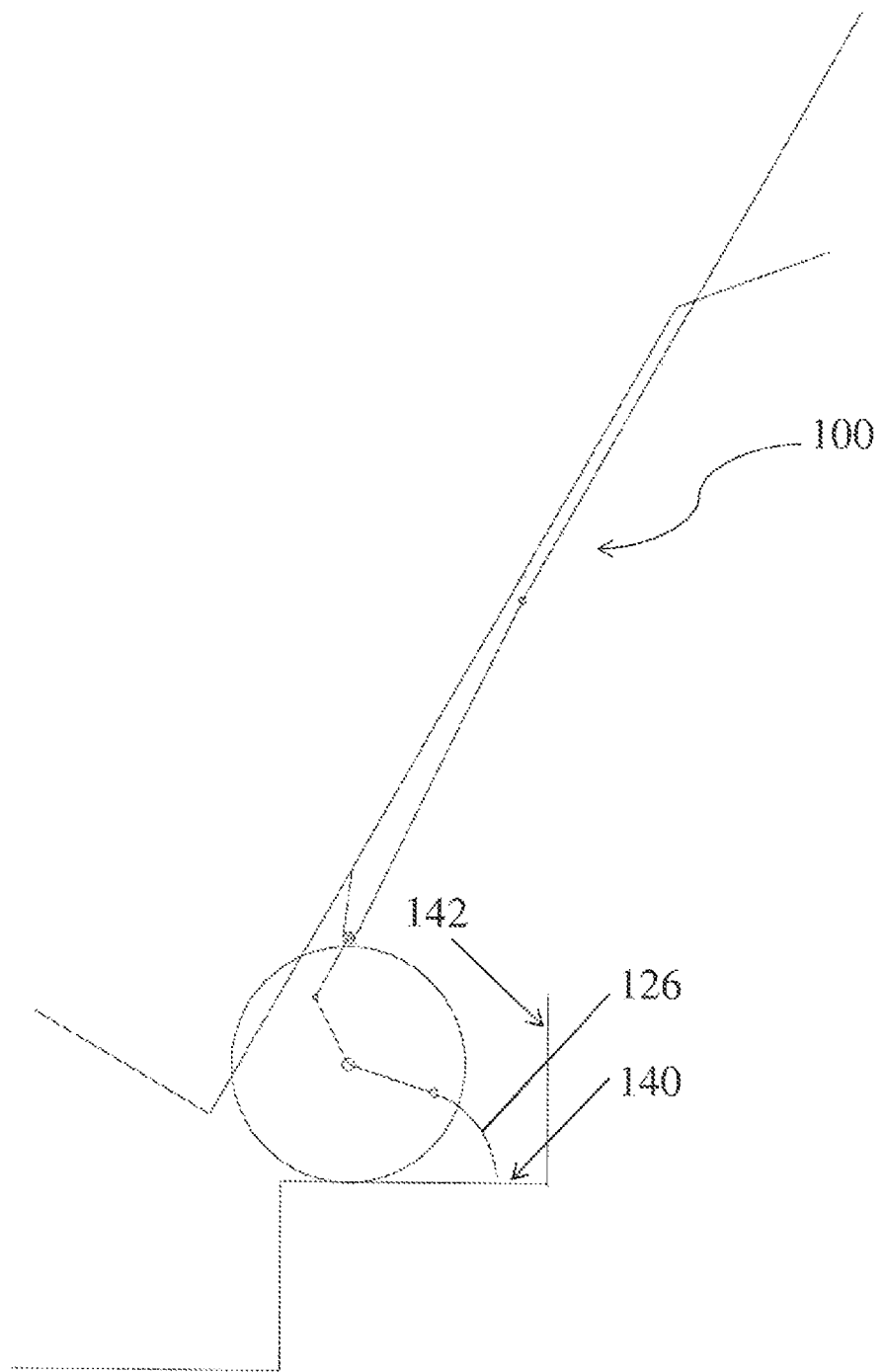
FIG. 11 illustrates the cart moving toward a subsequent step in accordance with one embodiment.

Referring now to FIG. 10, the arm 103 is moved to a fully extended position as the operator employs the cart 100 to raise the load up onto the surface 140. The further upward travel of the handle 103 draws the attachment point 141 of the cable 104 upward. With the first attachment point 139 fixed in place, the result is an upward movement of the link 132 as the cable travels on the pulley 138. This action causes further clockwise rotation of the arm 107 about the axle 111. FIG. 11 illustrates the cart 100 with the wheels fully on the surface 140. As described previously, the user can tilt the handle 103 away from the surface of the next step 142 if they wish to disengage the distal end 126 of the arm 107 from the surface 140 and roll the wheels 102 on the surface 142. According to other embodiments, it is unnecessary for the operator to disengage the distal end 126 from the surface 140. Instead, the operator rolls the cart against the surface 142 with the distal end 126 sliding along the surface 140, for example, on the rollers 110. As mentioned above, some embodiments do not include the roller 110.

Figure 12:
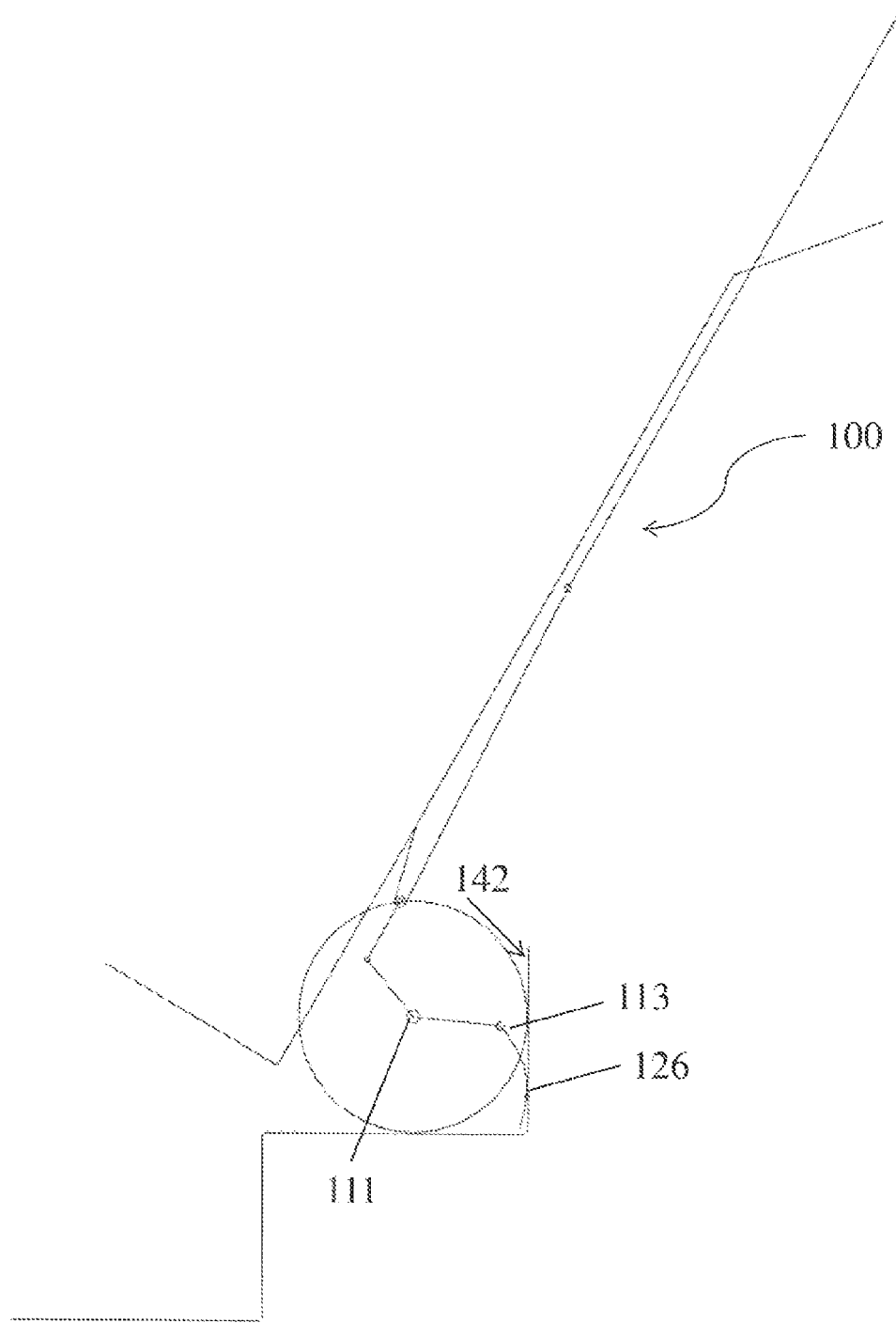
FIG. 12 illustrates the cart engaging the subsequent step in accordance with one embodiment.
Figure 13:
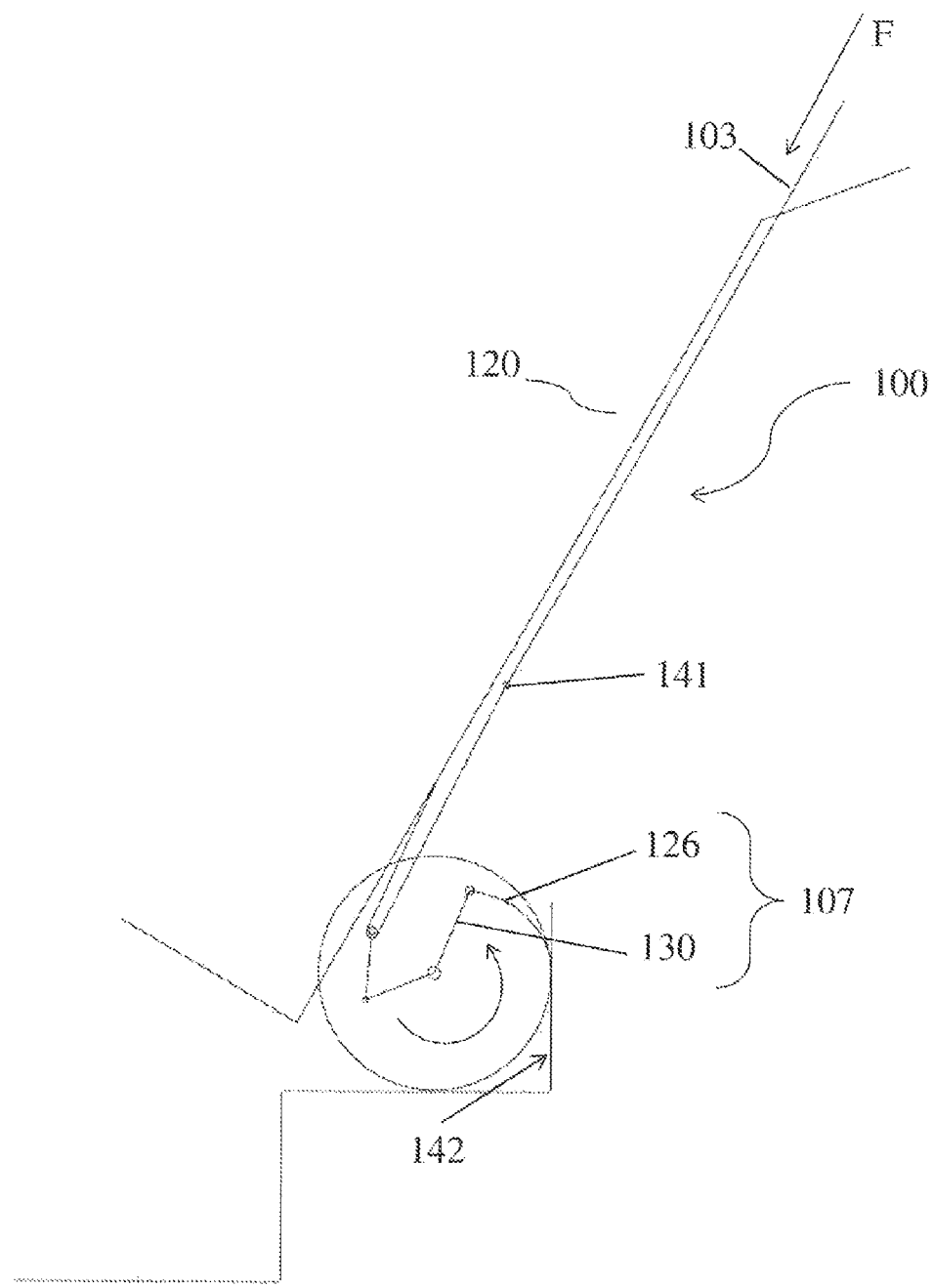
FIG. 13 illustrates the cart engaged with a subsequent step as the handle is returned toward a home position in accordance with one embodiment.

Referring now to FIG. 12, the handle 103 remains at least partially extended as the wheel is engaged with the face of the surface 142. As a result, the distal end of the arm 107 pivots about the pivot 113 as the wheel is pressed into engagement with the surface 142. This pivoting motion rotates the distal end 126 from the fully extended position and allows it to fold back toward the axle 111. Referring now to FIG. 13, the handle 103 is slid back partially within the frame on its return to the home position. As described for other embodiments, the retraction of the handle acts to allow the arm 107 to rotate counter-clockwise in a general direction of the frame 120. In the illustrated embodiment, the partial return of the handle 103 within the frame 120 moves the second attachment point 141 downward toward the base of the cart 100. The rotational force provided by the spring 106 acts rotate the body 130 of the arm 107 in the counter-clockwise direction as the cable moves about the pulley 138. As the body 130 is moved about the axis B, the distal end 126 slides upward along the vertical face 142 of the stair that is the next stair to be ascended and the proximate end 128 moves downward in a general direction away from the frame 120.

Figure 14:
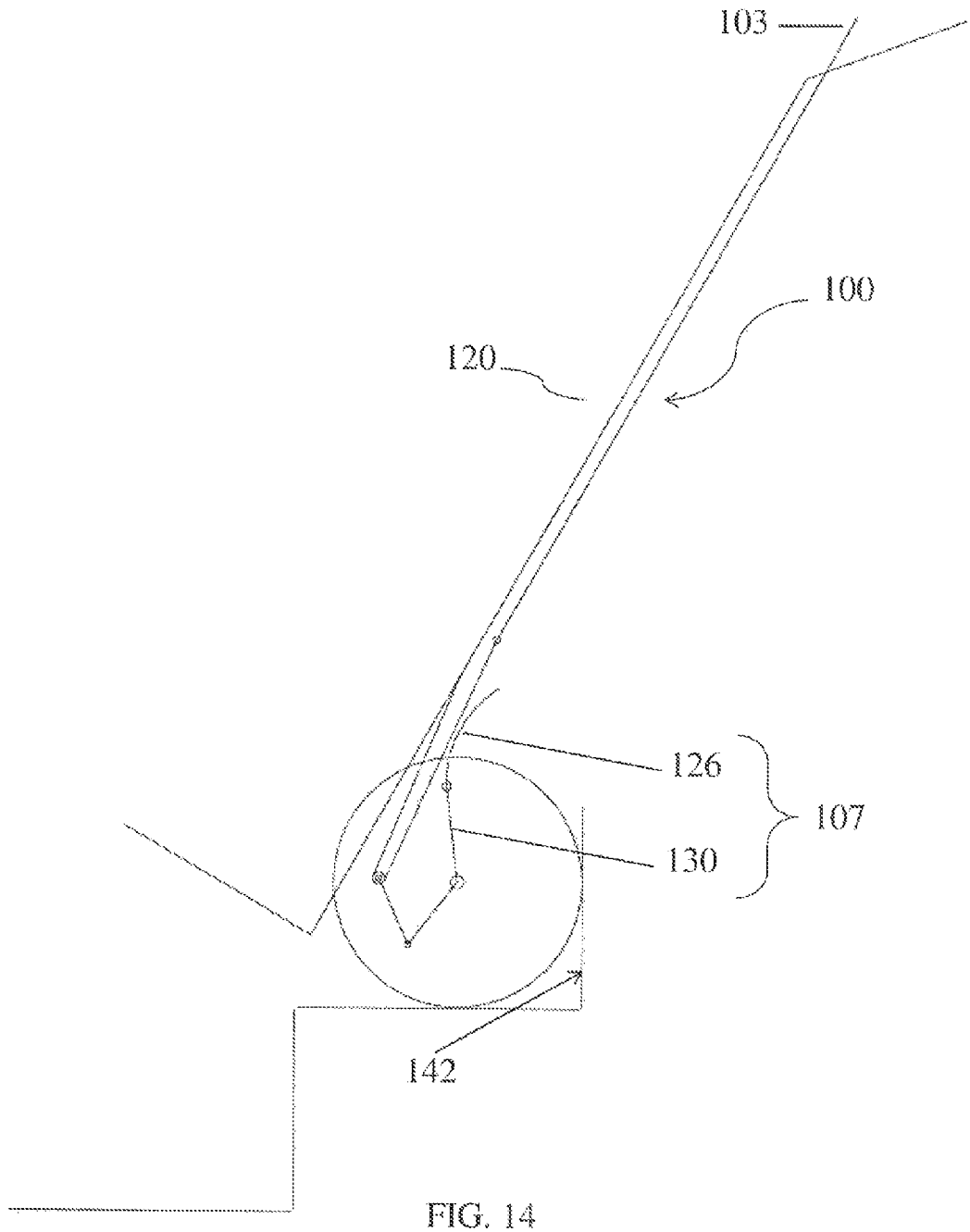
FIG. 14 illustrates the cart in engagement with the subsequent step with the handle fully returned to the home position in accordance with one embodiment.

Referring now to FIG. 14, the handle 103 is returned to the home position. As a result, arm 107 is also returned to the home position. As described herein, the return of the distal end 126 to the home position occurs when the distal end 126 is rotated such that it clears the surface 142. This allows the spring 108 to unfold the arm 107 and return the distal end 126 to a position adjacent the frame 120.

Where the second handle 121 is included, the handle 121 can be used to move the cart 100 in a conventional manner while the handle 103 is used to move the cart 100 up and down stairs or over other obstacles. According to the preceding, inclusion of two handles allow a position of the handle 103 to be determined solely based on its use for activating and moving the cart 100 up stairs while the position of the second handle 121 can be determined solely based on its use for moving the cart in other circumstances. Alternatively, the handle 103 is used for all of the preceding operations and the second handle 121 is not included. Either of the preceding embodiments can include a release mechanism, for example, a handle that is located parallel and adjacent the horizontal portion of the handle 103. According to these embodiments, the handle 103 and lifting mechanism are unlatched for operation when the release handle is activated. According to one embodiment, the release handle can be grasped and pulled against or adjacent the horizontal region of the handle 103 by an operator while the operator maintains a grip on the handle 103 to unlatch the lifting mechanism for use in the manner described above.

Figure 15C:
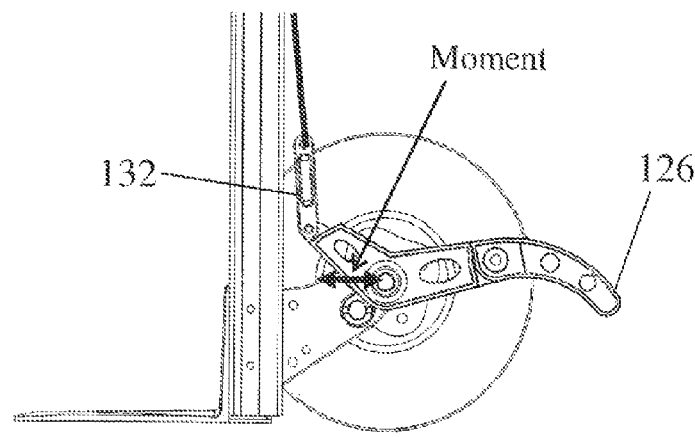
FIGS. 15A-15C illustrate various positions of the cart and lifting mechanism in accordance with one embodiment.
Figure 15B:
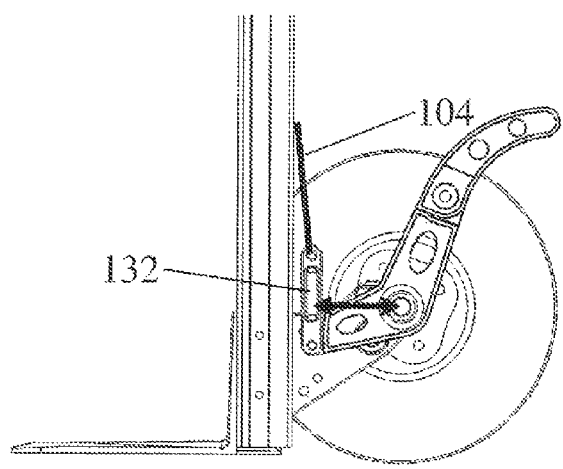
Figure 15A:
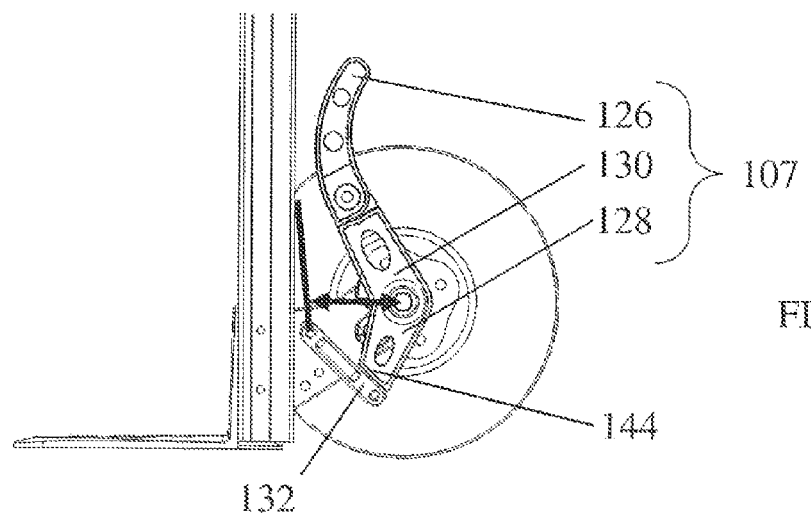

Referring now to FIGS. 15A-C, another view of the embodiment illustrated in FIGS. 7-14 is shown. This view shows a portion of a lifting mechanism including the link 132 attached at a proximate end 128 of the arm 107. FIG. 15A also illustrates an interference or stop 144 that prevents the proximate end of the link 132 from over rotating (movement in the counter clockwise direction as shown in FIG. 15A) under the force of the spring 106. In the illustrated embodiment, the proximate end of the arm 107 includes a flat abutment surface that the link contacts at the end of its rotation. As should be apparent to one of ordinary skill in the art in view of the disclosure herein, other structure such as a pedestal or bumper can be included at the proximate end of the arm 107 to provide the stop 144.

FIG. 15B illustrates the lifting mechanism 124 with the handle 103 partially extended from the cart. As illustrated, a distal end of the link 132 is raised upward as the cable 104 draws the end upward.

Referring now to FIG. 15C the lifting mechanism is illustrated with a handle 103 fully extended. As described previously, the link 132 is raised upward and the distal end 126 of the arm can be employed to assist in raising a load onto a horizontal surface of step.

Figure 16:
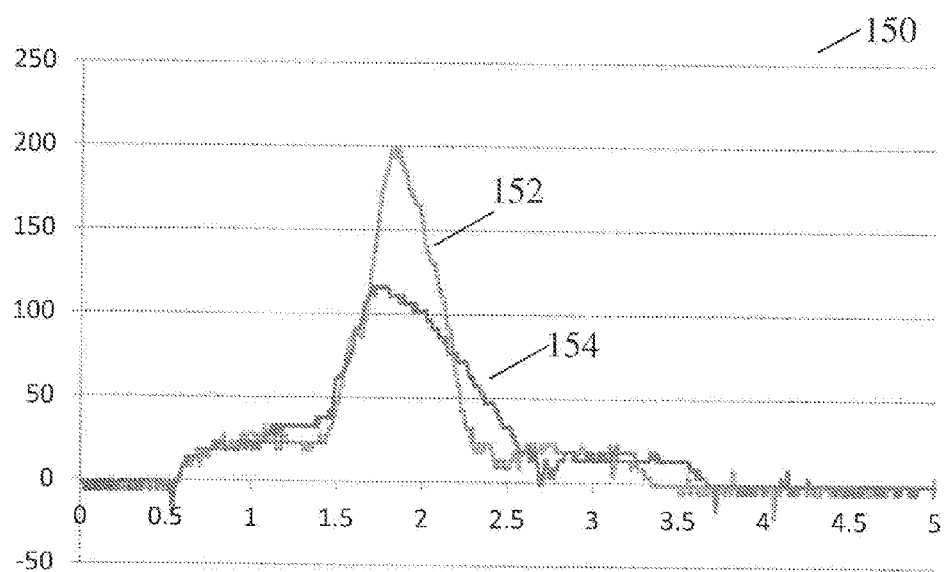
FIG. 16 illustrates a plot of forces required to move a load on a conventional cart and on the cart in accordance with one embodiment.

FIG. 16 illustrates a plot of the force vs. time as a load is moved up a step with a cart. In the plot, the vertical axis is force on the handle in pounds and the horizontal axis is time in seconds. The plot 150 includes a first plot 152 and a second plot 154. The first plot 152 requires a peak force of approximately 200 pounds to move an 80 pound load up a step. The second plot 154 requires a peak force of approximately 110 pounds to ascend the same step. Further, as should be apparent to those of ordinary skill in the art the load curve is more gradual when an embodiment of the cart 100 is employed. The preceding is illustrated by the lesser slope of the plot 154. For example, the second plot 154 illustrates not only a much lower force but also a more gradual fall in the force as the cart ascends the step. In contrast, as shown in the first plot, a rapid climb to the peak value of force is followed by a rapid descent as the cart ascends the step. Such a force curve can lead to instability as the operator has to handle the rapidly changing forces and higher peak load as the cart ascends the step without aid of the lifting mechanism.

Although embodiments are primarily described herein with reference to moving a loaded cart up a step or flight of stairs, the apparatus described herein can also be employed to assist a user moving a loaded cart down a step or flight of stairs. Here too, an improved ergonomic position results when descending stairs because the user maintains a more upright posture.

The apparatus, systems and methods described herein can be employed in other applications. According to further aspects, the handle 103 and lifting mechanism 124 can be included in a wheelchair, for example, a wheelchair used to move individuals such as hospital patients, the elderly or other individuals who are unable or unwilling to walk or are advised not to do so by a medical professional. According to these embodiments, the loaded wheelchair can more easily be moved up and down a step, flight of stairs or over other obstacles. As with the previously described embodiments, improved ergonomics can be achieved with the integration of the handle 103 and lifting mechanism 124 in the wheelchair.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A cart comprising:
a frame including a longitudinal axis;
at least two wheels coupled to the frame and rotatable about a central longitudinal axis;
an arm rotatable about the central longitudinal axis and extending radially therefrom, the arm including a distal end; and
a handle coupled to the arm and configured to allow a user to grasp the handle to move the cart up stairs, wherein the handle is configured to allow a substantially linear extension from the frame in a direction substantially parallel to the longitudinal axis by the user to cause the arm to rotate about the central longitudinal axis to engage the distal end with the stairs as they are ascended,
wherein the arm includes a pivot located between the central longitudinal axis and the distal end, the pivot configured to allow the distal end to rotate between an extended position and a folded position,
wherein the arm is configured such that the distal end engages a horizontal section of a step to bear at least a part of a load being moved with the cart, and
wherein the arm is configured such that the distal end is allowed to collapse by pivoting the distal end toward the central longitudinal axis when the distal end is engaged with a vertical surface of the step.

2. The cart of claim 1, further comprising a link including a first end attached to a proximate end of the arm and configured to pivot about the proximate end in response to the linear extension.

3. The cart of claim 2, wherein the link includes a second end, and wherein the cart further comprises a pulley located at the second end of the link.

4. The cart of claim 3, further comprising a line including a first end and a second end, wherein the substantially linear extension of the handle causes the line to travel on the pulley to raise the link in a direction of the substantially linear extension.

5. The cart of claim 4, wherein the first end of the line is connected to the frame, and wherein the second end of the line is connected to the handle.

6. The cart of claim 1, wherein the handle is moved linearly to reduce an extension of the handle from the frame, and wherein the cart is configured such that the distal end extends proximate to the frame when the handle is returned to a home position.

7. The cart of claim 1, further comprising a fixed handle configured to allow the user to move the cart.

8. The cart of claim 1, further comprising a cable, wherein the handle is coupled to the arm via the cable.

9. The cart of claim 8, further comprising a pulley, wherein the cable is coupled to the arm via the pulley.

10. The cart of claim 9, wherein a ratio provided by the pulley is selected to provide a desired distance in which the handle is extended to rotate the arm such that the distal end of the arm is placed into engagement with the stairs.

11. A cart comprising:
a frame including a longitudinal axis;
at least two wheels coupled to the frame and rotatable about a central longitudinal axis;
a lifting mechanism including a body rotatable about the central longitudinal axis, an arm coupled to the body at a pivot point and a link coupled to the body;
a cable coupled to the link and the frame;
a handle coupled to the link via the cable, wherein the handle is configured such that a substantially linear extension of the handle from the frame in a direction substantially parallel to the longitudinal axis moves the link upward which causes the body to rotate about the central longitudinal axis to engage a distal end of the arm with the stairs to provide a lifting-load-bearing motion; and
a pulley coupled to the link, wherein the cable is coupled to the link at the pulley.

12. The cart of claim 11, wherein a ratio provided by the pulley is selected to provide a desired distance in which the handle is extended to rotate the body such that the distal end of the arm is placed into engagement with the stairs.

13. The cart of claim 12, further comprising a stop to prevent an over-rotation of the body.

14. The cart of claim 13, wherein the stop is included in at least one of the lifting mechanism and the handle.

15. The cart of claim 12, wherein the lifting-load-bearing motion assists in raising the cart onto a horizontal surface, and wherein the ratio is selected to allow the cart to be rolled on the horizontal surface with the handle extended without the distal end in contact with the horizontal surface.

16. The cart of claim 11, wherein, with the handle in an extended position, the arm is free to pivot about the pivot point when the distal end is moved toward the central longitudinal axis.

* * * * *